United States Patent
Jamali et al.

(10) Patent No.: US 11,958,201 B2
(45) Date of Patent: Apr. 16, 2024

(54) SYSTEMS AND METHODS FOR VISUO-TACTILE OBJECT POSE ESTIMATION

(71) Applicant: Honda Motor Co., Ltd., Tokyo (JP)

(72) Inventors: Nawid Jamali, Dublin, CA (US); Huckleberry Febbo, Los Gatos, CA (US); Karankumar Patel, Sunnyvale, CA (US); Soshi Iba, Mountain View, CA (US); Akinobu Hayashi, Tokyo (JP); Itoshi Naramura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 281 days.

(21) Appl. No.: 17/024,647

(22) Filed: Sep. 17, 2020

(65) Prior Publication Data
US 2022/0080598 A1 Mar. 17, 2022

(51) Int. Cl.
*B25J 9/16* (2006.01)
*B25J 9/08* (2006.01)
*B25J 13/08* (2006.01)
*G06T 7/70* (2017.01)
*G06T 7/73* (2017.01)

(52) U.S. Cl.
CPC ............... *B25J 9/1697* (2013.01); *B25J 9/08* (2013.01); *B25J 9/161* (2013.01); *B25J 13/084* (2013.01); *B25J 13/088* (2013.01); *G06T 7/70* (2017.01); *G06T 7/73* (2017.01); G05B 2219/40575 (2013.01)

(58) Field of Classification Search
CPC ... G06T 7/70; G06T 7/73; G06T 2207/10016; G06T 2207/10028; G06T 2207/10024; G06T 2207/20084; B25J 9/161; B25J 9/1697; B25J 9/08; B25J 13/084; B25J 13/088; G05B 19/042; G05B 2219/40575
See application file for complete search history.

(56) References Cited

PUBLICATIONS

Lee MA, Zhu Y, Zachares P, Tan M, Srinivasan K, Savarese S, Fei-Fei L, Garg A, Bohg J. Making sense of vision and touch: Learning multimodal representations for contact-rich tasks. IEEE Transactions on Robotics. Jun. 4, 2020;36(3):582-96. (Year: 2020).*
Bimbo, Joao, et al. "Object pose estimation and tracking by fusing visual and tactile information." 2012 IEEE International Conference on Multisensor Fusion and Integration for Intelligent Systems (MFI). IEEE, 2012. (Year: 2012).*

(Continued)

*Primary Examiner* — Vu Le
*Assistant Examiner* — Tracy Mangialaschi
(74) *Attorney, Agent, or Firm* — RANKIN, HILL & CLARK LLP

(57) ABSTRACT

Systems and methods for visuo-tactile object pose estimation are provided. In one embodiment, a method includes receiving image data about an object and receiving depth data about the object. The method also includes generating a visual estimate of the object based on the image data and the depth data. The method further includes receiving tactile data about the object. The method yet further includes generating a tactile estimate of the object based on the tactile data. The method includes estimating a pose of the object based on the visual estimate and the tactile estimate.

20 Claims, 5 Drawing Sheets

(56) References Cited

PUBLICATIONS

Calandra, Roberto, et al. "More than a feeling: Learning to grasp and regrasp using vision and touch." IEEE Robotics and Automation Letters 3.4 (2018): 3300-3307. (Year: 2018).*
Gkanatsios N, Chalvatzaki G, Maragos P, Peters J. Orientation attentive robot grasp synthesis. arXiv preprint arXiv:2006.05123. Jun. 9, 2020. (Year: 2020).*
Cox, Rebecca E. Merging Local and Global 3D Perception for Robotic Grasping and Manipulation. Doctoral dissertation, University of Colorado at Boulder, 2017. (Year: 2017).*
Nock, Charles A., et al. "Assessing the potential of low-cost 3D cameras for the rapid measurement of plant woody structure." Sensors 13.12 (2013): 16216-16233. (Year: 2013).*
J. Bimbo, S. Rodriguez-Jiménez, H. Liu, X. Song, N. Burrus, L. D. Senerivatne, M. Abderrahim, and K. Althoefer, "Object Pose Estimation and Tracking by Fusing Visual and Tactile Information," Tech. Rep., 2012.
B. Calli, A. Singh, A. Walsman, S. Srinivasa, P. Abbeel, and A. M. Dollar, "The YCB object and Model set: Towards common benchmarks for manipulation research," in International Conference on Advanced Robotics, (ICAR), 2015.
T. To, J. Tremblay, D. McKay, Y. Yamaguchi, K. Leung, A. Balanon, J. Cheng, W. Hodge, and S. Birchfield, "NDDS: NVIDIA Deep Learning Dataset Synthesizer," 2018.
Andres S Vazquez, Raul Fernandez, Antonio Lopez, Enrique Valero, Ismael Payo, and Antonio Adan, "In-hand object localization: Simple vs. complex tactile sensors," In Sensors, 2014 IEEE, pp. 1710-1713.
M. Bauza, E. Valls, B. Lim, T. Sechopoulos, and A. Rodriguez, "Tactile Object Pose Estimation from the First Touch with Geometric Contact Rendering," 2020.
S. Hinterstoisser, V. Lepetit, S. Ilic, S. Holzer, G. Bradski, K. Konolige, and N. Navab, "Model Based Training, Detection and Pose Estimation of Texture-Less 3D Objects in Heavily Cluttered Scenes," in Asian Conference on Computer Vision (ACCV), 2012.
M. K. Johnson and E. H. Adelson, "Retrographic Sensing for the Measurement of Surface Texture and Shape," in IEEE Conference on Computer Vision and Pattern Recognition (CVPR), 2009.
J. Mahler, J. Liang, S. Niyaz, M. Laskey, R. Doan, X. Liu, J. Aparicio Ojea, and K. Goldberg, "Dex-Net 2.0: Deep Learning to Plan Robust Grasps with Synthetic Point Clouds and Analytic Grasp Metrics," in Robotics: Science and Systems (RSS), 2017.
T. Wang, C. Yang, F. Kirchner, P. Du, F. Sun, and B. Fang, "Multimodal Grasp Data Set: A Novel visual-tactile Data Set for Robotic Manipulation," International Journal of Advanced Robotic Systems, 2019.
N. Wettels, J. A. Fishel, and G. E. Loeb, "Multimodal Tactile Sensor," in The Human Hand as an Inspiration for Robot Hand Development, 2014.
A. Yamaguchi and C. G. Atkeson, "Recent progress in tactile sensing and sensors for robotic manipulation: can we turn tactile sensing into vision?" Advanced Robotics, 2019.
Achint Aggarwal and Frank Kirchner, "Object recognition and localization: The role of tactile sensors," Sensors, 14(2):3227-3266, 2014.
Joao Bimbo, Shan Luo, Kaspar Althoefer, and Hongbin Liu, "In-hand object pose estimation using covariance-based tactile to geometry matching," IEEE Robotics and Automation Letters, 1(1):570-577, 2016.
Charles Fox, Mat Evans, Martin Pearson, and Tony Prescott, "Tactile slam with a biomimetic whiskered robot," In 2012 IEEE International Conference on Robotics and Automation, pp. 4925-4930.
Shan Luo, Joao Bimbo, Ravinder Dahiya, and Hongbin Liu, "Robotic tactile perception of object properties: A review," Mechatronics, 48:54-67, 2017.
Jonathan Tremblay, Thang To, Balakumar Sundaralingam, Yu Xiang, Dieter Fox, and Stan Birchfield, "Deep object pose estimation for semantic robotic grasping of household objects," In Conference on Robot Learning (CoRL), 2018.
Jacob Varley, Chad DeChant, Adam Richardson, Joaquin Ruales, and Peter Allen, "Shape completion enabled robotic grasping," In 2017 IEEE/RSJ International Conference on Intelligent Robots and Systems (IROS), pp. 2442-2447.
Chen Wang, Danfei Xu, Yuke Zhu, Roberto Martin-Martin, Cewu Lu, Li Fei-Fei, and Silvio Savarese, "Densefusion: 6d object pose estimation by iterative dense fusion," CoRR, abs/1901.04780, 2019.
David Watkins-Valls, Jacob Varley, and Peter Allen, "Multi-modal geometric learning for grasping and manipulation," In 2019 International Conference on Robotics and Automation (ICRA), pp. 7339-7345.
Yu Xiang, Tanner Schmidt, Venkatraman Narayanan, and Dieter Fox, "Posecnn: A convolutional neural network for 6d object pose estimation in cluttered scenes," CoRR, abs/1711.00199, 2017.
Office Action of U.S. Appl. No. 17/372,859 dated Dec. 8, 2023, 45 pages.

* cited by examiner

SYSTEMS AND METHODS FOR VISUO-TACTILE OBJECT POSE ESTIMATION

BACKGROUND

Manipulation of objects is one of the remaining key challenges of robotics. In recent years, tremendous progress has been made in the area of data-driven grasp synthesis. Given an object, the goal is to infer a suitable grasp that adheres certain properties, e.g. stability or functionality. In many cases, this grasp is then performed in an open loop manner without taking any feedback into account. Furthermore, once the object is grasped, the grasp devices may occlude the object such that image data of the object is not received for at least a portion of the object. This approach can lead to a very poor success rate especially in the presence of noisy and incomplete sensor data, inaccurate models, or in a dynamic environment.

BRIEF DESCRIPTION

According to one embodiment, a system for visuo-tactile object pose estimation is provided. The system includes a processor, a visual module, a tactile module, and a pose module. The processor receives sensor data including image data, depth data, and tactile data regarding an object in an environment. The visual module is configured to generate a visual estimate of the object based on the image data and the depth data. The tactile module is configured to generate a tactile estimate of the object based on the tactile data. The pose module estimates the pose of the object based on the visual estimate and the tactile estimate.

According to another embodiment, a method for visuo-tactile object pose estimation is provided. The method includes receiving image data from a first optical sensor about an object in an environment. The method also includes receiving depth data from a second optical sensor about the object in the environment. The method includes generating a visual estimate of the object based on the image data and the depth data. The method further includes receiving tactile data from a force sensor about the object. The method includes generating a tactile estimate of the object based on the tactile data. The method yet further includes estimating a pose of the object based on the visual estimate and the tactile estimate.

According to yet another embodiment, a non-transitory computer readable storage medium storing instructions that, when executed by a computer having a processor, cause the computer to perform a method for visuo-tactile object pose estimation. The method includes receiving image data from a first optical sensor about an object in an environment. The method also includes receiving depth data from a second optical sensor about the object in the environment. The method includes generating a visual estimate of the object based on the image data and the depth data. The method further includes receiving tactile data from a force sensor about the object. The method includes generating a tactile estimate of the object based on the tactile data. The method yet further includes estimating a pose of the object based on the visual estimate and the tactile estimate.

DETAILED DESCRIPTION

Figure 1:
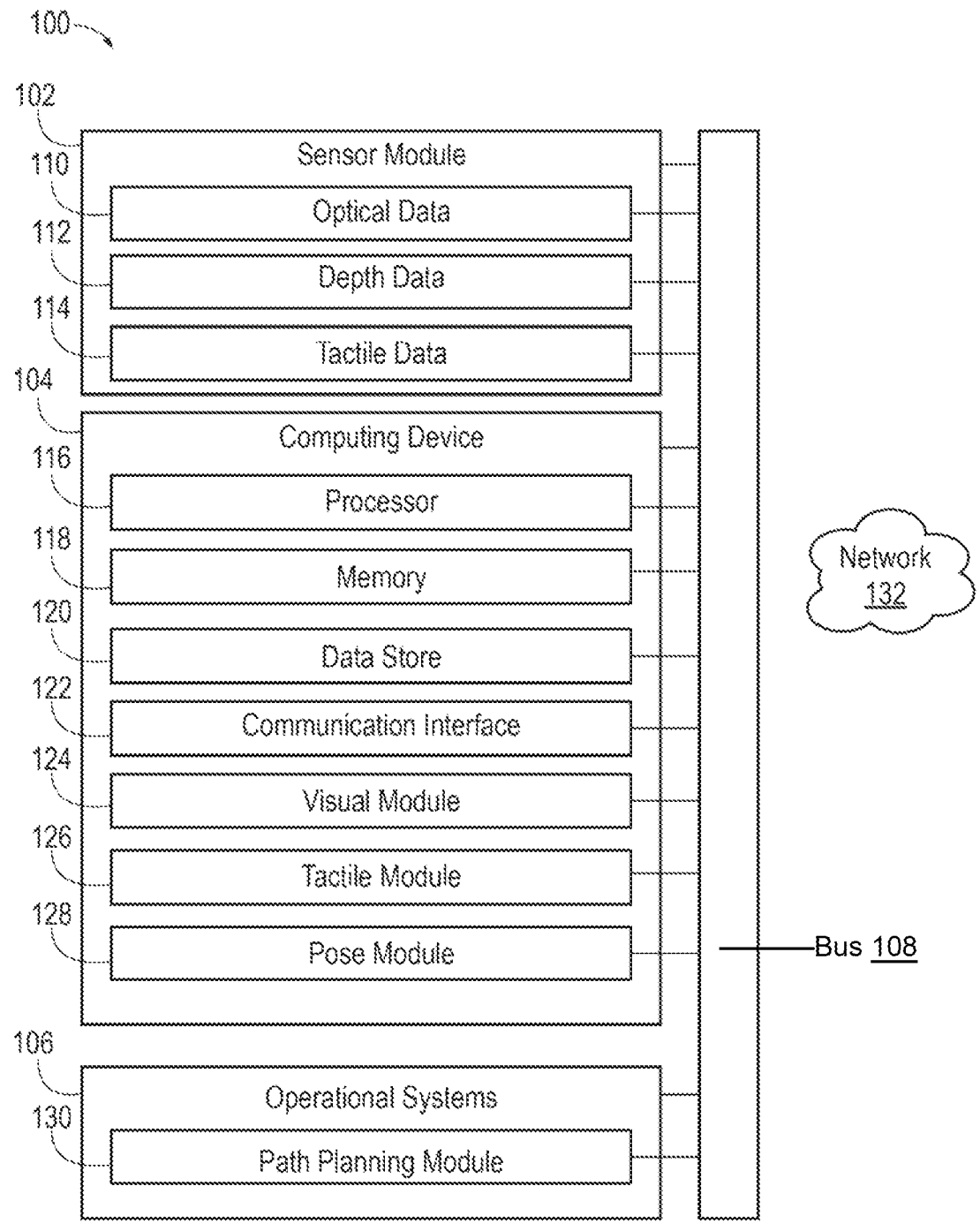
FIG. 1 is an exemplary component diagram of a system for visuo-tactile object pose estimation, according to one aspect.

Systems and methods for visuo-tactile object pose estimation. Existing pose estimation is divided to three main categories: geometry matching, probabilistic methods, and machine learning methods. Geometric methods use tactile-geometric-shape coherence descriptors to estimate the pose of the object. These techniques are fast to implement, however, they suffer from slow run-time performance. Probabilistic methods use computational algorithms, such as particle filters, Simultaneous Localization and Mapping (SLAM), and Monte Carlo methods, to estimate object poses. The probabilistic methods require excessive contacts with the object and also suffer from slow run-time performance. Machine learning methods have fast run-time performance but are reliant on visual information and do not use tactile information. Furthermore, the machine learning methods are directed to determining the shape of an object. Shape is an inherent characteristic of the object regardless of the environment.

Here, the systems and methods estimate the pose of an object. The pose of an object defines the object by its location in a three-dimensional space. For example, in a Cartesian coordinate system, the object may be defined by a series of point or boundaries in x, y, and z planes. The pose may also include pitch, roll, and yaw to define how the object moves and interacts in the environment. Accordingly, the pose may be identified in six dimensions.

The systems and methods described herein, image data, depth data, and tactile data regarding an object are used to estimate the pose of the object. In some embodiments, image data may be used to determine a region of interest (RoI) or type of object. For example, the image data may be provided to an object segmentation neural network to determine the RoI. The RoI may be used to remove objects that are not of interest. The image data and the depth data are used to generate a visual estimate of the object. The tactile data is used to generate a tactile estimate of the object. The tactile estimate includes data from force sensor that may occlude image data. The pose of the object may then be estimated based on the visual estimate and the tactile estimate. Therefore, the tactile data can be used to improve the pose estimation accuracy even when a portion of the object is occluded.

Definitions

The following includes definitions of selected terms employed herein. The definitions include various examples and/or forms of components that fall within the scope of a term and that can be used for implementation. The examples are not intended to be limiting. Furthermore, the components discussed herein, can be combined, omitted, or organized with other components or into different architectures.

"Agent" as used herein is a self-propelled machine that moves through or manipulates an environment. Exemplary agents can include, but is not limited to, robots, vehicles, or other self-propelled machines. The agent may be autonomously, semi-autonomously, or manually operated.

"Agent system," as used herein can include, but is not limited to, any automatic or manual systems that can be used to enhance the agent, propulsion, and/or safety. Exemplary systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), an electronic pretensioning system, a monitoring system, a passenger detection system, a suspension system, a seat configuration system, a cabin lighting system, an audio system, a sensory system, an interior or exterior camera system among others.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a bus that interconnects components inside a agent using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more communicating devices (e.g., computer, personal digital assistant, cellular telephone, network device, vehicle, computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein can include input and/or output devices for receiving input and/or devices for outputting data. The input and/or output can be for controlling different agent features, which include various agent components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. In one embodiment, a database can be stored, for example, at a disk, data store, and/or a memory. A database may be stored locally or remotely and accessed via a network.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Display," as used herein can include, but is not limited to, LED display panels, LCD display panels, CRT display, touch screen displays, among others, that often display information. The display can receive input (e.g., touch input, keyboard input, input from various other input devices, etc.) from a user. The display can be accessible through various devices, for example, though a remote system. The display may also be physically located on a portable device, mobility device, or host.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/ or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more users and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more users and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more users. Further, the term "vehicle" can include vehicles that are automated or non-automated with pre-determined paths or free-moving vehicles.

I. System Overview

Referring now to the drawings, the drawings are for purposes of illustrating one or more exemplary embodiments and not for purposes of limiting the same. FIG. 1 is an exemplary component diagram of an operating environment 100 for visuo-tactile object pose estimation, according to one aspect. The operating environment 100 includes a sensor module 102, a computing device 104, and operational systems 106 interconnected by a bus 108. The components of the operating environment 100, as well as the components of other systems, hardware architectures, and software architectures discussed herein, may be combined, omitted, or organized into different architectures for various embodiments. The computing device 104 may be implemented with a device or remotely stored.

The computing device may be implemented as a part of an agent. The agent may be bipedal, two-wheeled, four-wheeled robot, vehicle, or self-propelled machine. The autonomous ego agent may be configured as a humanoid robot. The humanoid robot may take the form of all or a portion of a robot. For example, the humanoid robot may take the form of an arm with fingers. The computing device 104 may be implemented as part of a telematics unit, a head unit, a navigation unit, an infotainment unit, an electronic control unit, among others of an ego agent. In other embodiments, the components and functions of the computing device 104 can be implemented, for example, with other devices 530 (e.g., a portable device) or another device connected via a network (e.g., a network 132). The computing device 104 may be capable of providing wired or wireless computer communications utilizing various protocols to send/receive electronic signals internally to/from components of the operating environment 100. Additionally, the computing device 104 may be operably connected for internal computer communication via the bus 108 (e.g., a Controller Area Network (CAN) or a Local Interconnect Network (LIN) protocol bus) to facilitate data input and output between the computing device 104 and the components of the operating environment 100.

Figure 2:
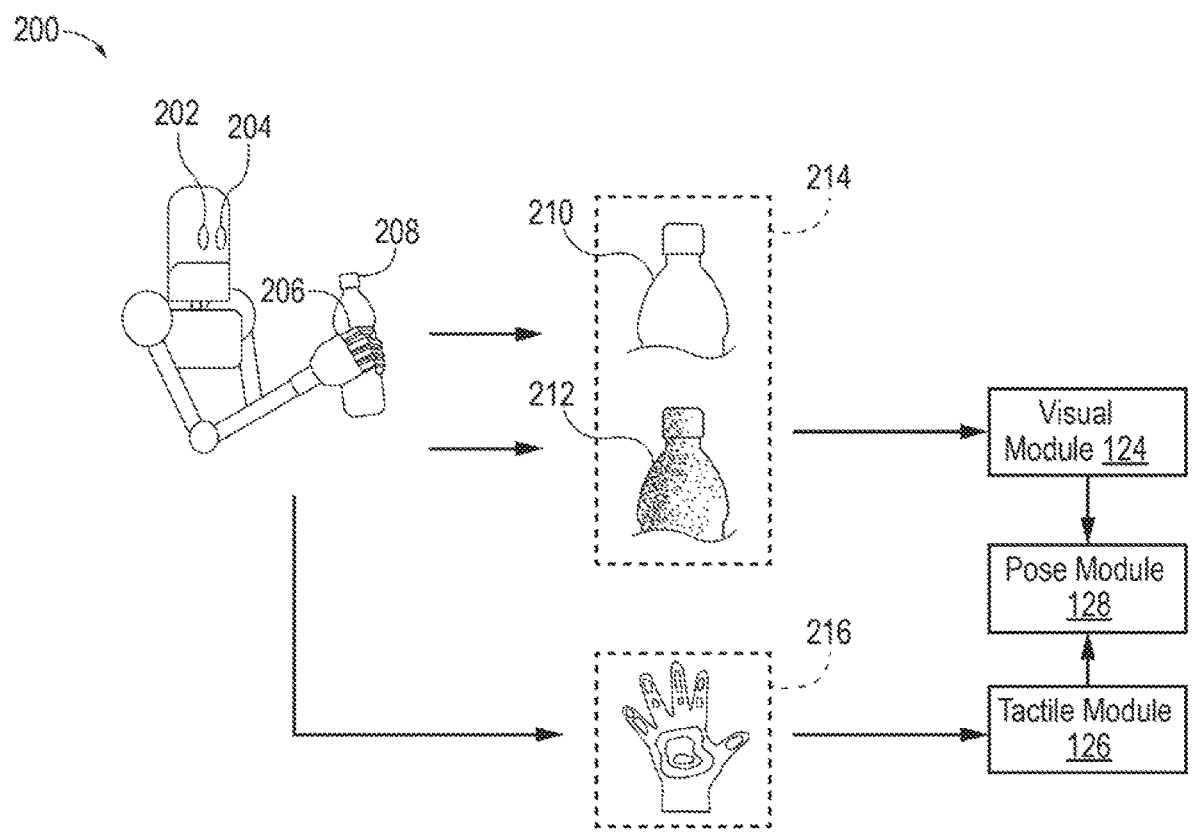
FIG. 2 is an exemplary process flow of a method for visuo-tactile object pose estimation, according to one aspect.

In some embodiments, the ego agent may be the agent 200 shown in FIG. 2. The ego agent 200 has a number of sensors. For example, the agent 200 including, but not limited to, a first optical sensor 202, a second optical sensor 204, and a force sensor 206. The first optical sensor 202, the second optical sensor 204, and the force sensor 206 receive data from an environment of an object 208. The sensor module 102 receives, provides, and/or senses information associated with the agent 200, an object 208, the operating environment 100, an environment of the agent 200, and/or the operational systems 106. In one embodiment, the sensor module 102 receives image data 110, depth data 112, and tactile data 114 from the sensors. For example, the sensor module 102 may receive image data 110 from the first optical sensor 202, depth data 112 from the second optical sensor 204, and the tactile data 114 from the force sensor 206. The computing device 104 receives the image data 110, the depth data 112, and the tactile data 114 from the sensor module 102.

Accordingly, the sensors 202-206 and/or the sensor module 102 are operable to sense a measurement of data associated with the agent 200, the operating environment 100, the object 208, the environment, and/or the operational systems 106 and generate a data signal indicating said measurement of data. These data signals can be converted into other data formats (e.g., numerical) and/or used by the sensor module 102, the computing device 104, and/or the operational systems 106 to generate other data metrics and parameters. It is understood that the sensors can be any type of sensor, for example, acoustic, electric, environmental, optical, imaging, light, pressure, force, thermal, temperature, proximity, gyroscope, and accelerometers, among others.

The computing device 104 includes a processor 116, a memory 118, a data store 120, and a communication interface 122, which are each operably connected for computer communication via a bus 108 and/or other wired and wireless technologies. The communication interface 122 provides software and hardware to facilitate data input and output between the components of the computing device 104 and other components, networks, and data sources, which will be described herein. Additionally, the computing device 104 also includes a visual module 124, a tactile module 126, and a pose module 128, for visuo-tactile object pose estimation facilitated by the components of the operating environment 100.

The visual module 124, the tactile module 126, and/or the pose module 128 may be an artificial neural networks that act as a framework for machine learning, including deep learning. For example, the visual module 124, the tactile module 126, and/or the pose module 128 may be a convolution neural network (CNN). In one embodiment, the visual module 124 may be a depth CNN, the tactile module 126 may be a force CNN, and the pose module may be a pose CNN. In another embodiment, the visual module 124, the tactile module 126, and/or the pose module 128 may further include or implement concatenator, a recurrent neural network (RNN), and/or a long short term memory (LSTM). The visual module 124, the tactile module 126, and/or the pose module 128 may include an input layer, an output layer, and one or more hidden layers, which may be convolutional filters.

The computing device 104 is also operably connected for computer communication (e.g., via the bus 108 and/or the communication interface 122) to one or more operational systems 106. The operational systems 106 can include, but are not limited to, any automatic or manual systems that can be used to enhance the agent, operation, and/or safety. The operational systems 106 may dependent on the implementation. For example, the operational system may include a path planning module 130. The path planning module 130 monitors, analyses, operates the device to some degree. As another example, in a vehicular embodiment, the operational systems 106 may include a brake system (not shown), that monitors, analyses, and calculates braking information and facilitates features like anti-lock brake system, a brake assist system, and an automatic brake prefill system.

The operational systems 106 also include and/or are operably connected for computer communication to the sensor module 102. For example, one or more sensors of the sensor module 102 may be incorporated with the path planning module 130 to monitor characteristics of the environment or the agent.

The sensor module 102, the computing device 104, and/or the operational systems 106 are also operatively connected for computer communication to the network 132. The network 132 is, for example, a data network, the Internet, a wide area network (WAN) or a local area (LAN) network. The network 132 serves as a communication medium to various remote devices (e.g., databases, web servers, remote servers, application servers, intermediary servers, client machines, other portable devices). Using the system and network configuration discussed above, anomalous events can be detected. Detailed embodiments describing exemplary methods using the system and network configuration discussed above will now be discussed in detail.

II. Methods for Pose Estimation

Figure 3:
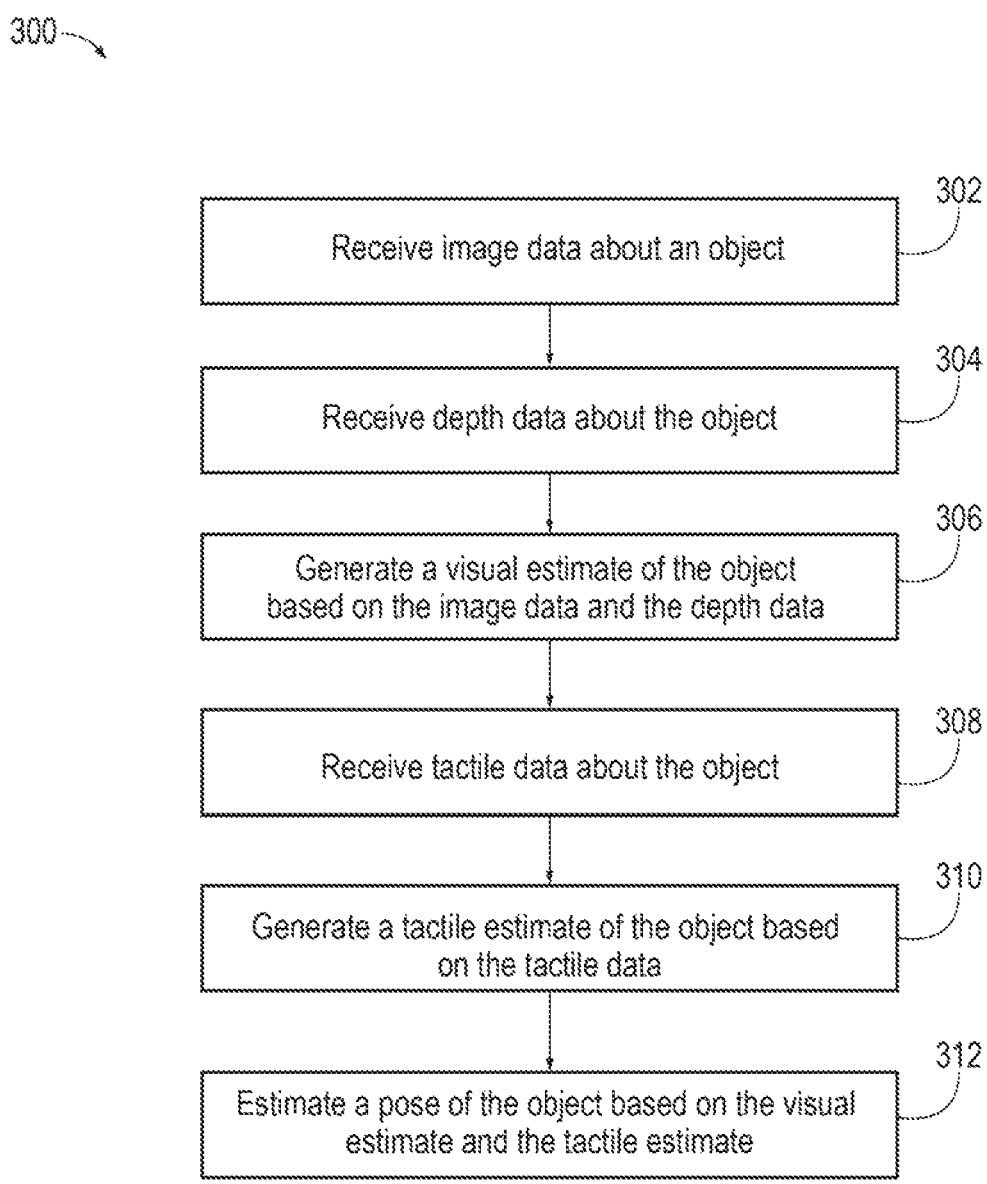
FIG. 3 is an exemplary agent environment of a system for visuo-tactile object pose estimation, according to one aspect.

Referring now to FIG. 3, a method 300 for visuo-tactile object pose estimation will now be described according to an exemplary embodiment. FIG. 3 will also be described with reference to FIGS. 1, 2, 4 and 5. For simplicity, the method 300 will be described as a sequence of elements, but it is understood that the elements of the method 300 can be organized into different architectures, blocks, stages, and/or processes.

At block 302 the method 300 includes the sensor module 102 receiving image data 110 about an object 208 in an environment. The image data 110 may be received from the first optical sensor 202. The image data 110 may include a video sequence or a series of images, user inputs, and/or data from the operational systems 106, such as data from a Controller Area Network (CAN) bus including as pedal pressure, steer angle, etc. The image data 110 may be received from the first optical sensor 202. The first optical sensor 202 may include radar units, lidar units, image capture components, sensors, cameras, scanners (e.g., 2-D scanners or 3-D scanners), or other measurement components. In some embodiments, the image data 110 is augmented as additional sensor data from other sources is received. For example, the image data 110 from the first optical sensor 202 may be augmented by other sources, such as the second optical sensor 204, and/or remote devices (e.g., via the bus 108 and/or the communication interface 122).

The image data 110 may correspond to the portion of the object 208 that is not occluded by the agent 200 or the environment. For example, as shown in FIG. 2, the agent 200 is holding an object 208, shown here as a bottle, with a force sensor 206 represented by the hand of the agent 200. Suppose the image data 110 may be image data, such as RGB data, YCB data, and/or YUV data. The image data 110 may form a visualized dataset 210 of the portion of the object 208 that can be visualized by the first optical sensor 202. The visualized dataset 210 may be a color image corresponding to the image data 110 visible by the first optical sensor 202. Therefore, the portion of the object 208 occluded by the force sensor 206 may not be represented in the visualized dataset 210.

In some embodiments, the visual module 124 may use the image data 110 to determine a region of interest (RoI) or type of the object 208. For example, the image data may be provided to an object 208 segmentation neural network to determine the RoI of the object 208. In some embodiments, the RoI may be used to remove extraneous objects that are not of interest to streamline data processing. The RoI may also be used to focus on a specific portion of the object 208 or classify the object 208 by type. Object classification may facilitate registering the image data 110 with the depth data 112 and/or the tactile data 114.

At block 304 the method 300 includes the sensor module 102 receiving depth data 112 about the object 208 in the environment. The depth data 112 may be received from the second optical sensor 204. The depth data 112 may include a video sequence or a series of images, user inputs, and/or data from the operational systems 106, such as data from a Controller Area Network (CAN) bus including as pedal pressure, steer angle, etc. The depth data 112 may be received from the second optical sensor 204. The second optical sensor 204 may include radar units, lidar units, image capture components, ranging sensors, cameras, scanners (e.g., 2-D scanners or 3-D scanners), or other measurement components. In some embodiments, the depth data 112 is augmented as additional sensor data from other sources is received. For example, the depth data 112 from the second optical sensor 204 may be augmented by other sources, such as the first optical sensor 202, and/or remote devices (e.g., via the bus 108 and/or the communication interface 122).

The depth data 112 may correspond to the portion of the object 208 that is not occluded by the agent 200 or the environment. The depth data contains information relating to the distance of the surfaces of the object 208 from a viewpoint, such as the agent 200 or the second optical sensor 204. The depth data 112 may form a depth dataset 212 of the portion of the object 208 that can be assessed by the second optical sensor 204. Accordingly, the portion of the object 208 occluded by the force sensor 206 may not be represented in the depth dataset 212 of the object 208.

For clarity, the method is described with respect to a single object 208. However, the image data 110 and the depth data 112 may be associated with one or more objects. Accordingly, the agent 200 may detect or identify one or more of the entities, objects, obstacles, hazards, and/or corresponding attributes or characteristics a position or a location associated with the object 208 as well as other objects.

At block 306 the method 300 includes the visual module 124 generating a visual estimate of the object 208 based on the combined dataset 214 of the image data 110 and the depth data 112. The visual estimate is a pose estimate of the object 208. In some embodiments, visual module 124 generates the visual estimate based on a first convolutional neural network (CNN). For example, the first CNN may be used to obtain the image features and reconstruct the fused image. In another embodiment, an encoding and decoding network may be used to obtain image features.

At block 308 the method 300 includes the method 300 includes the sensor module 102 receiving tactile data 114 about the object 208. The tactile data 114 may include pressure mapping, force mapping, user inputs, and/or data from the operational systems 106, such as data from a Controller Area Network (CAN) bus including as pedal pressure, steer angle, etc. In some embodiments, the sensor module 102 may receive the tactile data 112 as a contact-surface point cloud.

The tactile data 114 may be received from the force sensor 206. The force sensor 206 may include tensile force sensors, compressions force sensors, tensile and force compression sensors, or other measurement components. The force sensor 206 may be with a Weiss gripper with GelSight tactile sensors. In some embodiments, the tactile data 114 is augmented as additional sensor data from other sources is received. For example, the tactile data 114 from the force sensor 206 may be augmented by other sources, such as additional force sensors (e.g., from a second hand of the agent 200), and/or remote devices (e.g., via the bus 108 and/or the communication interface 122).

The tactile data 114 may correspond to the portion of the object 208 that is occluded by the agent 200 or the environment. For example, the portion of the object 208 occluded by the force sensor 206 can be provided based on the tactile data 114 received from the force sensor 206. In this manner, the tactile data 114 provides additional data about object that may not be captured by the first optical sensor 202 and the second optical sensor 204. The tactile data 114 is aggregated to form a tactile dataset 216. Because the tactile data 114 is based on contact with the object, the tactile dataset 216 may not include information about portions of the object 208 not in contact with the agent 200 but supplement the combined dataset 214.

At block 310 the method 300 includes the method 300 includes the tactile module 126 generating a tactile estimate of the object 208 based on the tactile dataset 216. Like the visual estimate, the tactile estimate is another pose estimate of the object 208. In some embodiments, visual module 124 generates the visual estimate based on a second CNN. For example, the second CNN may be used to obtain the surface features of the object. In another embodiment, an encoding and decoding network may be used to obtain information about the surface features.

At block 312 the method 300 includes the pose module 128 estimating a pose of the object based on the visual estimate and the tactile estimate. In some embodiments, the estimation may be based on a fully connected CNN layer. Accordingly, the visual estimate and the tactile estimate can be used in combination to estimate the pose of the object. In particular the object 208 may be identified in the environment based on a coordinate system as well as movement about predetermined axes. For example, the object 208 may be defined by contours in 3-dimension coordinate systems, such as x, y, and z, as well as by pitch, yaw, and roll. In this manner the pose is more than the mere shape of the object 208 because shape is merely an inherent characteristic of the object 208. Instead, the pose defines where the object 208 is in the environment as well as the orientation of the object 208.

Using the image data 110, the depth data 112, and the tactile data 114 to estimate the pose of the object 208 that is grasped by the agent 200 allows the agent 200 to estimate portions of the object 208 that can't be seen. Specifically, using the combined dataset 214 and the tactile dataset 216 based on the image data 110, the depth data 112, and the tactile data 114 provides a more accurate estimation than using the image data 110 alone, especially when the object 208 of interest is occluded by the agent 200. Furthermore, using the depth data 112 and tactile data 114 eliminates the need for computationally expensive post processing algorithms, like iterative closest point algorithm (ICP) and improves accuracy for occluded portions of the object 208.

Figure 4:
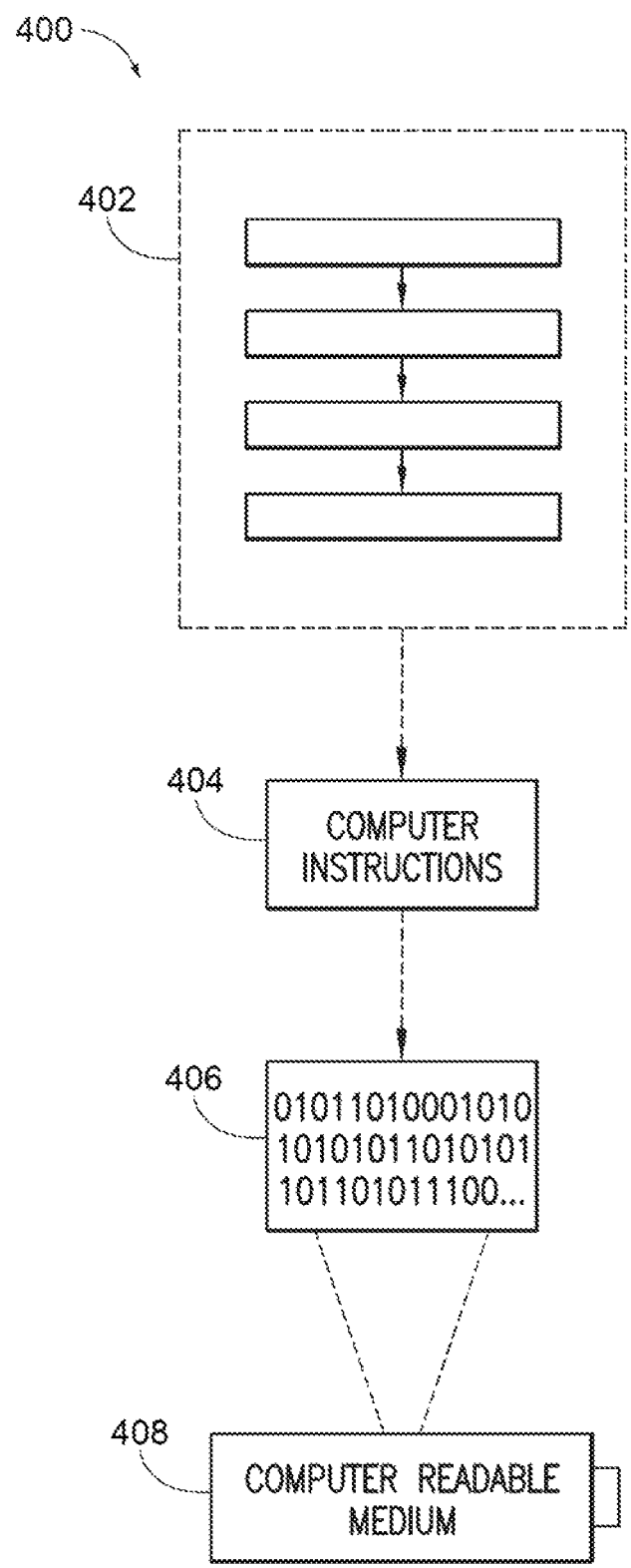
FIG. 4 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 4, wherein an implementation 400 includes a computer-readable medium 408, such as a CD-R, DVD-R, flash drive, a platter of a hard disk drive, etc., on which is encoded computer-readable data 406. This encoded computer-readable data 406, such as binary data including a plurality of zero's and one's as shown in 406, in turn includes a set of processor-executable computer instructions 404 configured to operate according to one or more of the principles set forth herein. In this implementation 400, the processor-executable computer instructions 404 may be configured to perform a method 402, such as the method 300 of FIG. 3. In another aspect, the processor-executable computer instructions 404 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 5:
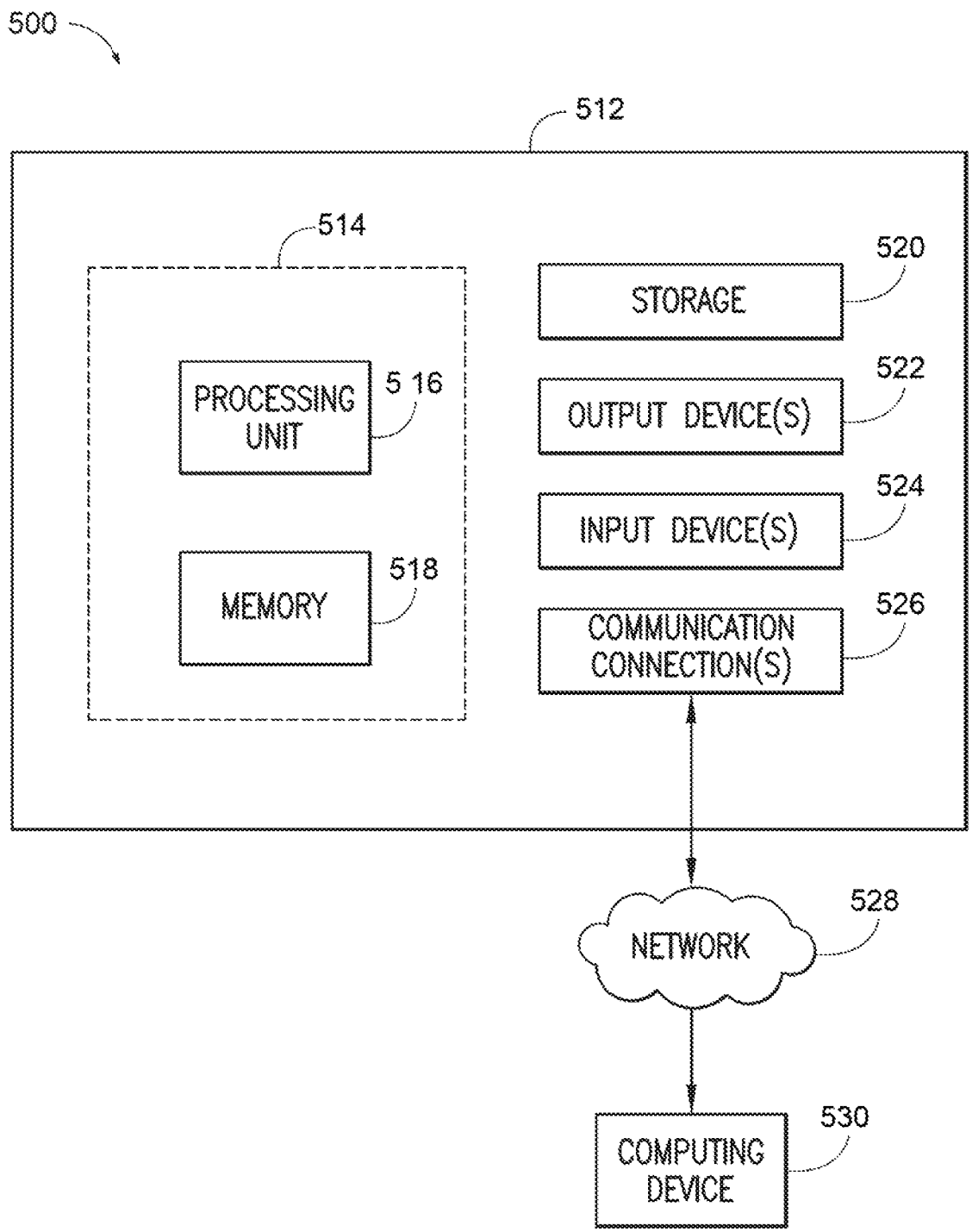
FIG. 5 is an illustration of an example computing environment where one or more of the provisions set forth herein are implemented, according to one aspect.

FIG. 5 and the following discussion provide a description of a suitable computing environment to implement aspects of one or more of the provisions set forth herein. The operating environment of FIG. 5 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 5 illustrates a system 500 including an apparatus 512 configured to implement one aspect provided herein. In one configuration, the apparatus 512 includes at least one processing unit 516 and memory 518. Depending on the exact configuration and type of computing device, memory 518 may be volatile, such as RAM, non-volatile, such as ROM, flash memory, etc., or a combination of the two. This configuration is illustrated in FIG. 5 by dashed line 514.

In other aspects, the apparatus 512 includes additional features or functionality. For example, the apparatus 512 may include additional storage such as removable storage or non-removable storage, including, but not limited to, magnetic storage, optical storage, etc. Such additional storage is illustrated in FIG. 5 by storage 520. In one aspect, computer readable instructions to implement one aspect provided herein are in storage 520. Storage 520 may store other computer readable instructions to implement an operating system, an application program, etc. Computer readable instructions may be loaded in memory 518 for execution by processing unit 516, for example.

The term "computer readable media" as used herein includes computer storage media. Computer storage media includes volatile and nonvolatile, removable and non-removable media implemented in any method or technology for storage of information such as computer readable instructions or other data. Memory 518 and storage 520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the apparatus 512. Any such computer storage media is part of the apparatus 512.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The apparatus 512 includes input device(s) 524 such as keyboard, mouse, pen, voice input device, touch input device, infrared cameras, video input devices, or any other input device. Output device(s) 522 such as one or more displays, speakers, printers, or any other output device may be included with the apparatus 512. Input device(s) 524 and output device(s) 522 may be connected to the apparatus 512 via a wired connection, wireless connection, or any combination thereof. In one aspect, an input device or an output device from another computing device may be used as input device(s) 524 or output device(s) 522 for the apparatus 512. The apparatus 512 may include communication connection(s) 526 to facilitate communications with one or more other devices 530, such as through network 528, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for visuo-tactile object pose estimation, comprising:
a sensor module, implemented via a processor, configured to:
receive image data about an object in an environment;
receive depth data about the object in the environment; and
receive tactile data about the object in the environment;
a visual module, implemented via the processor, configured to generate a visual estimate of the object by processing a combined dataset of the image data and the depth data into a reconstructed fused image;
a tactile module, implemented via the processor, configured to separately generate a tactile estimate of the object by processing the tactile data; and
a pose module, implemented via the processor, configured to estimate a pose of the object based on the visual estimate and the tactile estimate, wherein
the visual module employs a first convolutional neural network (CNN) to process the combined dataset of the image data and the depth data.

2. The system of claim 1, wherein the image data is RGB data from a first optical sensor.

3. The system of claim 1, wherein the depth data is received from a second sensor that is a ranging sensor.

4. The system of claim 1, wherein the tactile module employs a second CNN, and wherein the pose module employs a fully connected CNN layer.

5. The system of claim 1, wherein the visual module, implemented via the processor, is further configured to determine a region of interest (RoI) based on the image data.

6. The system of claim 5, wherein the RoI is determined based on an object segmentation neural network.

7. A method for visuo-tactile object pose estimation, comprising:
receiving image data about an object in an environment;
receiving depth data about the object;
generating a visual estimate of the object by processing a combined dataset of the image data and the depth data into a reconstructed fused image;
receiving tactile data about the object;
generating, separately, a tactile estimate of the object by processing the tactile data; and
estimating a pose of the object based on the visual estimate and the tactile estimate, wherein
the visual estimate is generated based on a first convolutional neural network (CNN) to process the combined dataset of the image data and the depth data.

8. The method of claim 7, wherein the image data is RGB data from a first optical sensor.

9. The method of claim 7, wherein the depth data is received from a second sensor that is a ranging sensor.

10. The method of claim 7, wherein the tactile estimate is generated based on a second CNN, and wherein the pose is estimated based on a fully connected CNN layer.

11. The method of claim 7, the method further comprising determining a region of interest (RoI) based on the image data.

12. The method of claim 11, wherein the RoI is determined based on an object segmentation neural network.

13. The method of claim 7, wherein the pose of the object defines a location of the object in a three-dimensional space of the environment.

14. A non-transitory computer readable storage medium storing instructions that when executed by a computer having a processor to perform a method for visuo-tactile object pose estimation, the method comprising:
receiving image data about an object in an environment;
receiving depth data about the object;
generating a visual estimate of the object by processing a combined dataset of the image data and the depth data into a reconstructed fused image;
receiving tactile data about the object;
generating, separately, a tactile estimate of the object by processing the tactile data; and
estimating a pose of the object based on the visual estimate and the tactile estimate, wherein
the visual estimate is generated based on a first convolutional neural network (CNN) to process the combined dataset of the image data and the depth data.

15. The non-transitory computer readable storage medium of claim 14, wherein the image data is RGB data from a first optical sensor.

16. The non-transitory computer readable storage medium of claim 14, wherein the depth data is received from a second sensor that is a ranging sensor.

17. The non-transitory computer readable storage medium of claim 14, wherein the tactile estimate is generated based on a second CNN, and wherein the pose is estimated based on a fully connected CNN layer.

18. The non-transitory computer readable storage medium of claim 14, the method further comprising determining a region of interest (RoI) based on the image data.

19. The non-transitory computer readable storage medium of claim 18, wherein the RoI is determined based on an object segmentation neural network.

20. The non-transitory computer readable storage medium of claim 14, wherein the pose of the object defines a location of the object in a three-dimensional space of the environment.

* * * * *